United States Patent
Roetker et al.

(10) Patent No.: US 8,498,527 B2
(45) Date of Patent: Jul. 30, 2013

(54) WATER HEATING CONTROL AND STORAGE SYSTEM

(75) Inventors: John Joseph Roetker, Louisville, KY (US); Michael Finch, Louisville, KY (US)

(73) Assignee: General Electric Company, Schenectady, NY (US)

(*) Notice: Subject to any disclaimer, the term of this patent is extended or adjusted under 35 U.S.C. 154(b) by 759 days.

(21) Appl. No.: 12/623,753

(22) Filed: Nov. 23, 2009

(65) Prior Publication Data
US 2011/0123179 A1 May 26, 2011

(51) Int. Cl.
*F24H 1/20* (2006.01)

(52) U.S. Cl.
USPC ............................. 392/454; 392/441; 392/449

(58) Field of Classification Search
None
See application file for complete search history.

(56) References Cited

U.S. PATENT DOCUMENTS

| | | | |
|---|---|---|---|
| 5,168,170 A * | 12/1992 | Hartig | 307/35 |
| 5,430,430 A | 7/1995 | Gilbert | |
| 5,544,036 A | 8/1996 | Brown, Jr. et al. | |
| 5,956,462 A * | 9/1999 | Langford | 392/449 |
| 6,208,806 B1 * | 3/2001 | Langford | 392/464 |
| 6,308,009 B1 * | 10/2001 | Shellenberger et al. | 392/454 |
| 6,493,643 B1 | 12/2002 | Aisa | |
| 6,681,154 B2 | 1/2004 | Nierlich et al. | |
| 6,861,621 B2 | 3/2005 | Ghent | |
| 6,961,642 B2 | 11/2005 | Horst | |
| 7,110,832 B2 | 9/2006 | Ghent | |
| 7,221,862 B1 * | 5/2007 | Miller et al. | 392/498 |
| 7,373,080 B2 * | 5/2008 | Baxter | 392/454 |
| 7,620,302 B2 * | 11/2009 | Lesage et al. | 392/454 |

* cited by examiner

*Primary Examiner* — Thor Campbell
(74) *Attorney, Agent, or Firm* — Global Patent Operation

(57) ABSTRACT

A water heating control and storage system, including an insulated tank for containing water to be heated. The tank has at least two heating elements, including an upper heating element and a lower heating element. An operation control device receives a demand response signal and enables each element to independently heat water for usage. A method for controlling a water heating storage system includes providing an insulated tank for containing water to be heated; providing an upper heating element with a thermostat and thermal limiting device and a lower heating element with a thermostat and thermal limiting device to heat upper and lower portions of water inside the tank; and providing a pair of switches for enabling each of the heating elements to independently heat upper and lower portions of the water for usage.

23 Claims, 7 Drawing Sheets

WATER HEATING CONTROL AND STORAGE SYSTEM

BACKGROUND OF THE DISCLOSURE

The present disclosure relates generally to managing water heater systems. More particularly, it relates to managing and controlling water heater systems as a function of off-peak energy demand periods.

Water heater storage tanks are used for storing and supplying hot water to households. A typical residential water heater holds about fifty gallons (190 liters) of water inside a steel reservoir tank. A thermostat is used to control the temperature of the water inside the tank. Many water heaters permit a consumer to set the thermostat to a temperature between 90 and 150 degrees Fahrenheit (F) (32 to 65 degrees Celsius (C)). To prevent scalding and to save energy, most consumers set the thermostat to heat the reservoir water to a temperature in a range between 120.0 degrees F. to 140.0 degrees F. (about forty-nine degrees C. to sixty degrees C.).

A water heater typically delivers hot water according to the thermostat temperature setting. As a consumer draws water from the water heater, the water temperature in the water heater usually drops. Any time the thermostat senses that the temperature of the water inside the tank drops too far below thermostat's set point, power is sent to the electric resistance heating element (or a burner in a gas water heater). The electric elements then draw energy to heat the water inside the tank to a preset temperature level.

Water heating constitutes 10-15% of household energy usage, totaling 7 to 14 kWh per day. In some locations of the United States and globally, the cost for electrical energy to heat water can depend upon the time of day, day of the week and season of the year. In areas of the United States where energy is at a premium, utility companies often divide their time of use rates into off-peak and on-peak energy demand periods with a significant rate difference between the periods. For example, energy used during off-peak hours may cost the consumer in United States dollars around 5 cents to 6 cents per kilowatt hour (kWh), while on-peak period energy may cost anywhere from 20 cents per kWh to $1.20 or more per kWh.

A water heater that heats based on the water demand of a typical household most likely will heat at the same time as when energy demand on a utility company is at its highest. As a result, drawing energy to heat a water heater during these on-peak energy periods increases a consumer's monthly energy bill. The disclosure seeks to provide a means to avoid on peak energy use, saving the consumer operating expense, while supplying a continuous supply of domestic hot water utilizing conventional and possibly existing electric water heating systems.

One approach to negotiate the utility companies' time of use energy rates would be to use a programmable timer to turn off the entire water heater or the lower element. For example, a clock timer could be used to provide planned heating periods during known off peak periods of the day. While this approach is possible, adapting to period variation in the rate schedule and emergency load shedding request signals from the utility are not accommodated.

Simply increasing the storage size of the tank and/or increasing the set temperature of the tank in combination with use of a thermostatic mixing valve at the hot water outlet, serves to increase the hot water capacity, but it does not alter the energy consumption pattern of the water heating system. The lower heating element will also need to be disengaged in order to avoid consumption during "on peak" energy rate hot water usage.

Set point alteration is another means to reduce heating events during on peak water usage. While this will produce a similar outcome as disengagement of the heating elements, it requires a substantially different control mechanism for regulation and limiting of the tank temperature and cannot be easily retrofit to an existing water heating system.

Another approach is simply shutting the entire water heater off during on peak energy periods. This could result in the consumer miming out of hot water during peak hours and left to wait until off peak hours to resume heating the entire stored water volume of the tank, meeting demand. This approach requires consumer behavior change or purchase and installation of a larger storage tank size to bridge the peak hour water usage. This results in an investment requirement from the consumer and presumes the availability of space to install a larger tank. Commonly, space limitation prevents installation of a water heater large enough to meet the storage requirements to bridge the peak hours.

A non-replenishing tank could be used to maintain heated temperatures during "on peak" hours and be refilled and heated only during off peak hours. However, this approach requires an open tank or a means to compensate for pressure and volume changes.

Thus, there is a need for a system which provides a continuous supply of domestic hot water to meet the needs of a consumer, while utilizing off peak energy rates for heating of the stored water. The technology also provides a valuable mechanism for a utility to shed load during peak and critical power demand periods.

SUMMARY OF THE DISCLOSURE

A water heating and storage system includes an insulated tank with an upper and lower heating element, each with independent temperature regulating and limiting capability and a control device for operating each element independently. The control is configured to provide heating input during low energy rate or usage conditions to minimize operating cost. The signal for the control indicative of the energy rate or usage condition can be either generated in accordance with a programmed time schedule, or an external input signal from the utility or energy provider indicating a change in energy cost rate or from the consumer/owner. The temperature set points for the upper and lower elements are established, the tank storage size is selected, and provision is made for mixing hot and cold water such that the usage during high energy rate conditions rarely triggers the thermostatic control on the upper tank element, except during extremely high usage conditions.

During low energy rate conditions, the lower element is engaged to heat the contents of the full tank for future use during high energy rate periods. The lower element is then disengaged during high energy rate periods according to the programmed schedule, or an external or consumer input, reducing energy consumption during high energy rate periods. A thermostatic mixing valve is used at the hot discharge of the storage tank to reduce the temperature of the stored water, reducing scalding risk and effectively increasing the thermal energy storage capacity of the system.

Conventional heating and storage devices and apparatus can be used to provide lower operating cost for service hot water with the addition of an operating control device, mixing valve and temperature set point adjustment. Energy saving may also be realized by reducing the daily mean storage tank temperature, compared to conventional water heating systems.

A water heating control and storage system includes an insulated tank for containing water to be heated; the tank has at least two heating elements, including an upper heating element and a lower heating element; and an operation control device for enabling each element to independently heat water for usage.

A method for controlling a water heating storage system, including the following steps: providing an insulated tank for containing water to be heated; providing an upper heating element with a thermostat and thermal limiting device and a lower heating element with a thermostat and thermal limiting device to heat upper and lower portions of water inside the tank, respectively; and providing first and second switches responsive to the rate or energy usage indicating signal for enabling or disabling energization each of the upper and lower heating elements to independently heat upper and lower portions of the water for usage in accordance with the rate or energy usage condition.

One aspect of the disclosure is that under normal usage conditions for a particular tank size, all or nearly all of the water heating energy load is deferred "off peak". Another aspect of the disclosure is that high demand usage during peak hours is supplied hot water, using only the upper element to recover by heating only the top portion of the tank versus the entire tank. Another aspect of the disclosure is existing thermostat and temperature limiting controls are used. The device can be either an integrated control feature or an add-on device to an existing water heater. Yet another aspect of the disclosure is a demand response (DR) signal can be user selected to respond to various signal levels according to water heater storage tank size, DR schedule structure and consumer selected conditions.

Another aspect of the disclosure is that energization of the upper and lower heating elements can be enabled/disabled independently based on the demand response signal level. Another aspect of the disclosure is the heated tank volume is variable based on the demand response level. Still another aspect of the disclosure is the heating operation corresponding to the demand response level is consumer selectable for multiple tier signals (which may be greater than four levels).

These and other aspects of the present disclosure will become apparent upon a reading of the detail description and a review of the accompanying drawings.

DETAILED DESCRIPTION OF THE PREFERRED EMBODIMENTS

Figure 4:
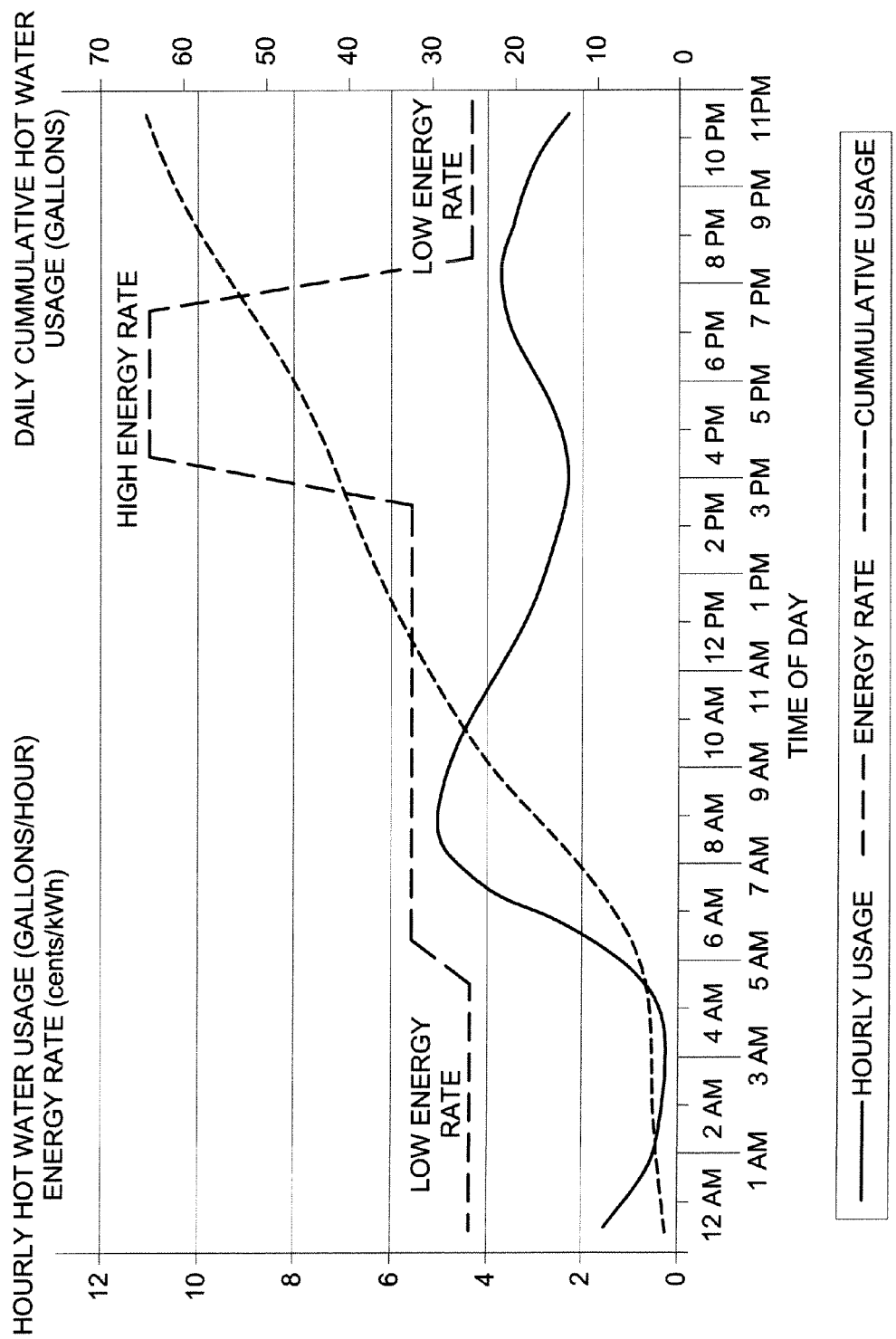
FIG. 4 is a graph illustrating time relationship to hot water usage.

FIG. 4 shows a graph illustrating the clock time relationship of typical hot water usage and the time of use energy rate. The graph illustrates that a typical 50-gallon storage tank will exhaust its stored supply of hot water during the high energy rate period—6:00 p.m. (between 4:00 p.m. and 7:00 p.m.) on the chart. An operation control device used with the water heater system in accordance with the present disclosure prevents complete heating of the tank during the peak period.

Figure 5A:
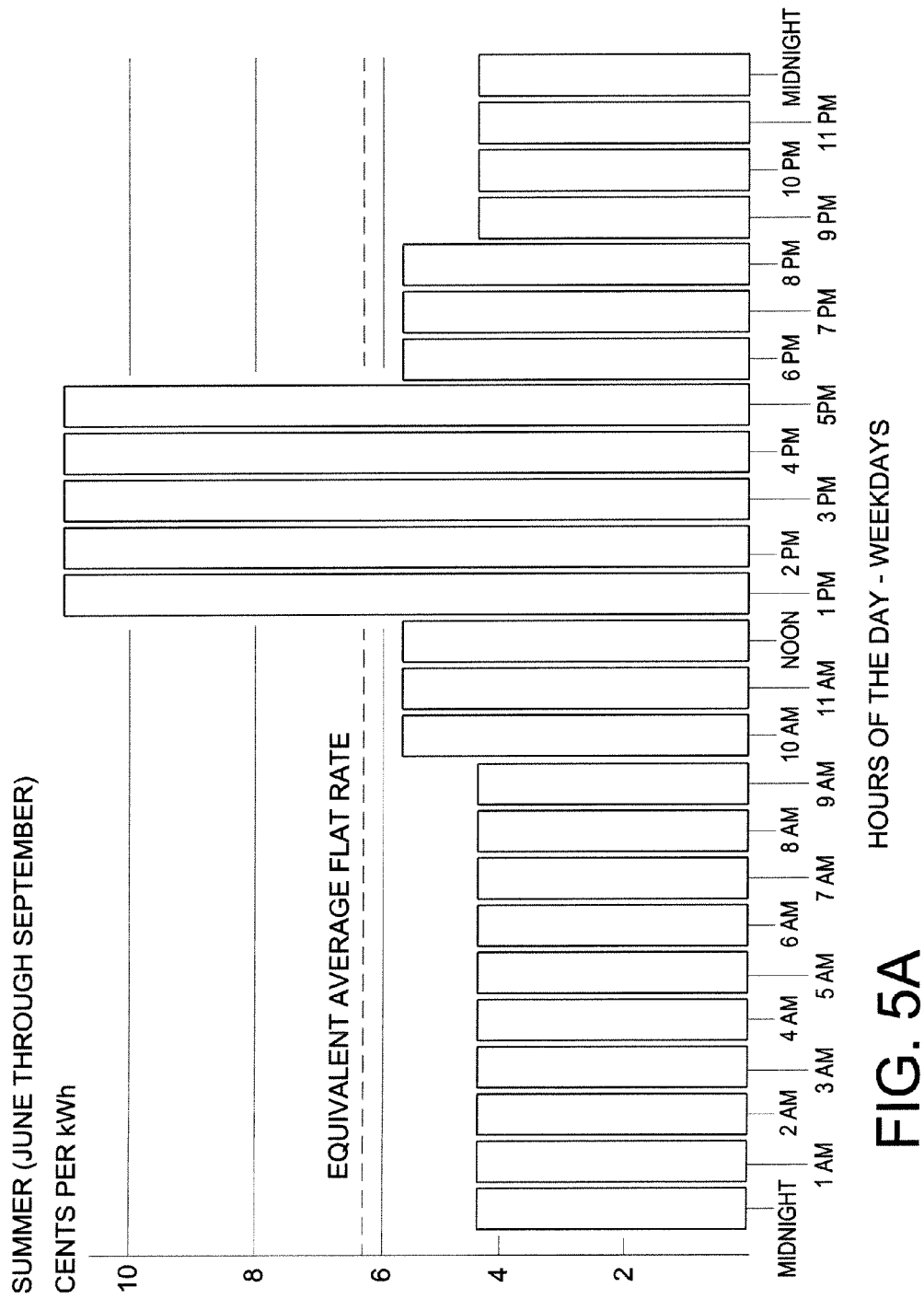
FIG. 5A illustrates a utility time of use rates for a summer season.
Figure 5B:
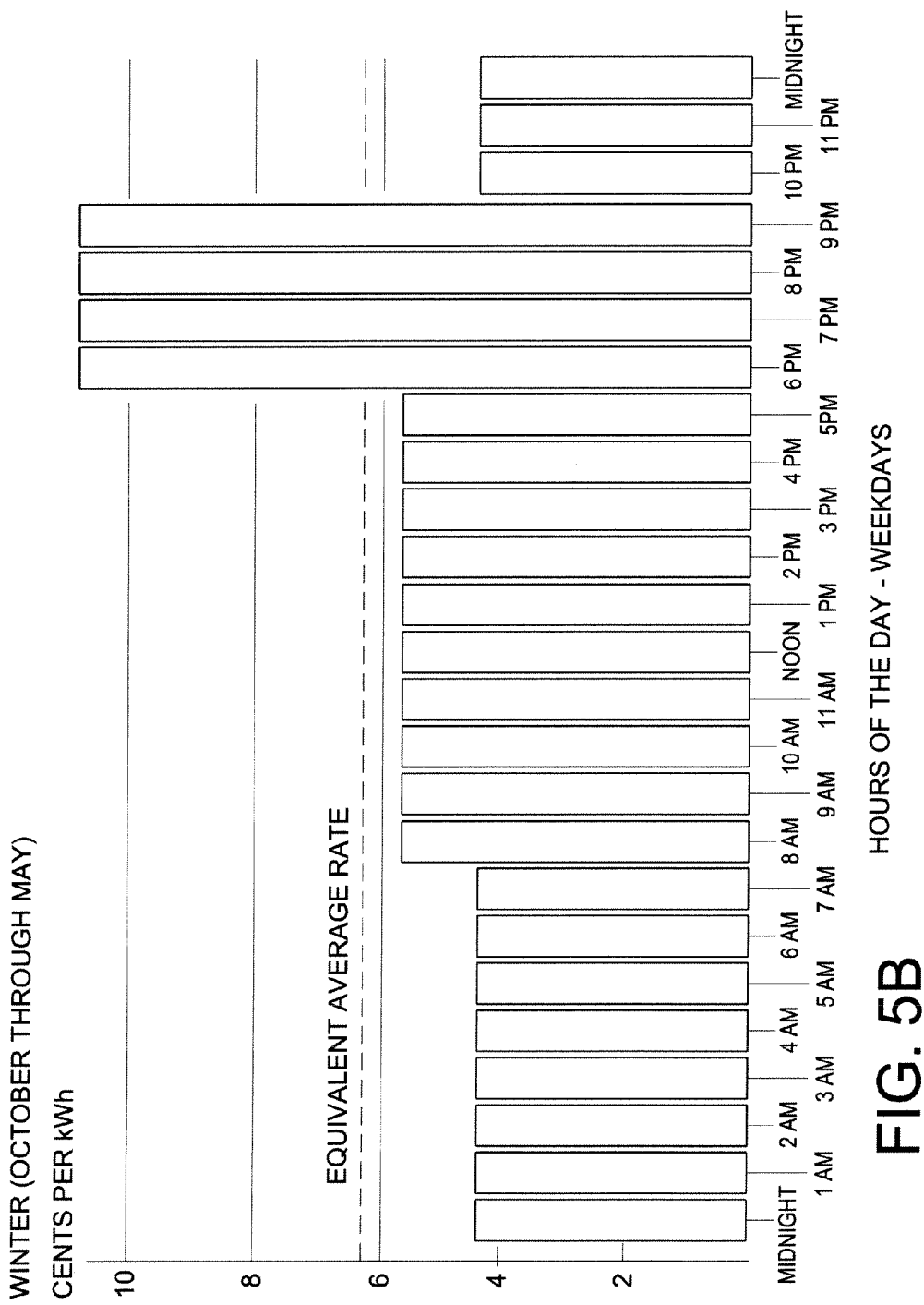
FIG. 5B illustrates a utility time of use rates for a winter season.

FIGS. 5A and 5B illustrates a utilities time of use rates for a summer season and winter season, respectively. The peaks mostly follow residential heating and cooling load and appliance (including water heating) consumer usage patterns. For example, rates peak between 1:00 p.m. and 5:00 p.m. in the summer and between 6:00 p.m. and 9:00 p.m. in the winter.

A water heating and storage system includes an insulated tank with upper and lower thermostatically controlled heating elements and an operation control device for enabling each element independently to heat and store water for usage. The control is configured to provide heating input during low energy rate conditions to minimize operating cost. Water is typically maintained in the storage tank at a temperature in the range of 120° F. to 140° F. Each heating element set point temperature can be adjusted independently. Over temperature and pressure conditions are managed by devices typical to storage water heating systems. The operating control is configured to provide heating input to both the upper and lower heating elements during low energy rate conditions to minimize operating cost. The signal for the operating control can be either a programmed time schedule, an external input signal from the utility, energy provider/manager or the consumer, indicating a change in energy cost rate.

The tank storage size is to be configured such that the usage during high energy rate conditions rarely triggers the thermostatic control on the upper tank element, except during extremely high usage conditions. The temperature set point of the upper element can also be adjusted to a lower level, such as 110° F., or lower to avoid or reduce the frequency of heating events during high energy rate conditions.

Conventional storage water heaters have a volume of 40 to 50 gallons. Based on consumer usage patterns, a larger tank, such as 80 to 100 gallons, may be advantageous for the consumer to avoid heating during on-peak energy rates. During low energy rate conditions, the lower element is engaged to heat the contents of the full tank for future use during high energy rate periods. A higher than typical lower element temperature set point such as 150° F. to 170° F., can be used to increase the stored energy of the system. The lower element is then disengaged during high energy rate periods according to the programmed schedule, external of consumer input, reducing energy consumption during high energy rate periods. A thermostatic mixing valve is used at the hot discharge of the storage tank to reduce the temperature of the hot water provided to the user, thereby allowing the thermal energy storage capacity of the system to be increased while limiting the temperature of the hot water provided to the user to the normal range.

Figure 1:
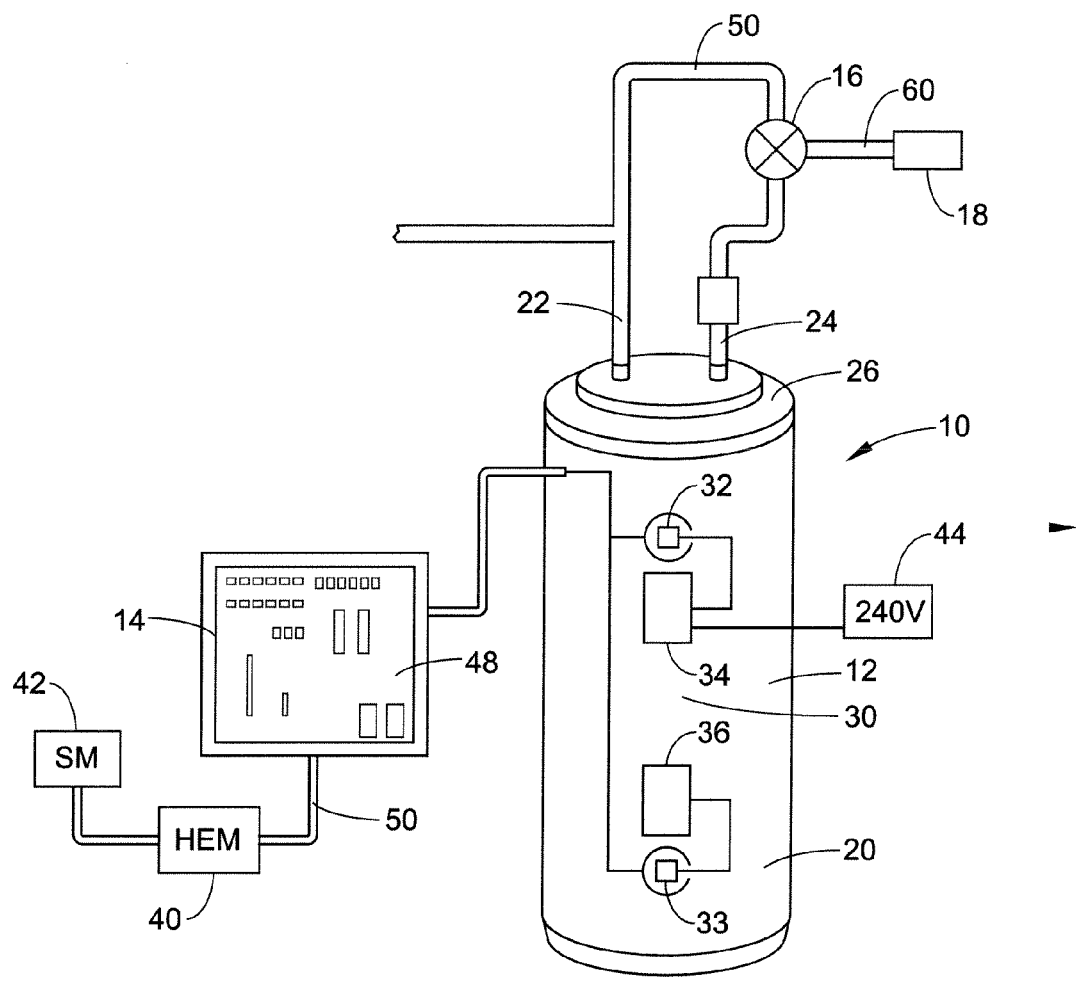
FIG. 1 is an isometric view of a water heater system in accordance with a preferred embodiment of the present disclosure.

Referring now to FIG. 1, a water heater system 10 in accordance with a preferred embodiment of the present disclosure is shown. The water heater system 10 includes a water heater 12, a control panel 14, a mixing valve 16, and a cutoff valve 18.

The water heater has a heater and a tank to store heated water. The water heater includes a shell 20, a "cold in" pipe 22, a "hot out" pipe 24, and a cover 26. The casing surrounds a tank 30 that acts as an interior reservoir for water. Insulation is provided around the exterior of the tank to reduce heat transfer. For typical domestic household use, the tank is preferably 80-gallon capacity or more. The cold in pipe delivers water to the water heater at a temperature less than about 120 degrees F. (about 49 degrees C.), typically 40 to 80 degrees F. (4 to 27 degrees C.). The hot out pipe conventionally delivers water away from the water heater at a temperature of about 120 degrees F. (about 49 degrees C.). The cover and base seals the shell providing an enclosure for the tank, insulation and wiring system.

The water heater further includes at least a pair of upper and lower heating elements 32, 33 and at least a pair of upper and lower thermostats 34, 36. More than two heating elements and thermostats can be provided without departing from the scope of the disclosure. The heating elements 32, 33 can be an electric resistance heating element or a heat exchanging device from a refrigeration system. Heating element 32 is an upper heating element, and heating element 33 is a lower heating element. The thermostats 34, 36 are thermomechanic devices that mechanically respond to temperature changes to either make or break the energy circuit controlling the heating element. The thermostat devices 34, 36 each includes thermal limiting devices to regulate and limit the water temperature in conventional fashion. The thermostatically controlled heating elements may be configured to operate either simultaneously or sequentially.

Typical upper and lower element settings are usually the same value and in a range from 120 degrees F. to 140 degrees F. for a conventional water heater with regard to demand response. When a water heater is being configured to perform under a demand response approach as described in this disclosure, the energy storage capacity of a water heater can be increased by elevating the lower element setting to a maximum level in the range of 150-170 degrees F. The upper element setting can also be reduced to a minimum level acceptable for usage, about 110 degrees F., in an effort to reduce energy consumption by minimizing heating events. In the illustrative embodiment the upper element setting is about 110 degrees F. (as contrasted with a typical setting of 135 degrees F.); and the lower element setting is about 150 degrees F. (as contrasted with the typical setting of 135 degrees F.). Since the lower element setting in this arrangement is likely to be higher than the desired temperature for the hot water delivered to the user, which is typically in the range of 110-120 degrees F., a mixing valve 16 is connected to blend water from the cold water supply line with the hot water drawn from the hot water heater to control the temperature of the hot water delivered to the user to the desired temperature. In the illustrative example the set point for the mixing valve is 120 degrees F.

The water heater system further includes mixing valve 16 connected to a cold in pipe and the hot out pipe. The temperature of the water in the cold in pipe is about 40 degrees F. to 80 degrees F. (about four degrees C. to twenty-seven degrees C.).

On receiving cold water from the cold in pipe and hot water from the hot out pipe, the mixing valve 16 is configured to combine the two different temperature waters into a mixed water having a temperature suitable for home use. For example, the water from the mixing valve outputs into a service pipe 60 is in the temperature range of about 110 degrees F. to 120 degrees F. (about forty-three degrees C. to forty-nine degrees C.).

The cutoff valve 18 is provided as a safety backup to the mixing valve. In other words, the cutoff valve is a thermostat-controlled safety device that automatically closes if the water in the service pipe 60 reaches a predetermined high temperature, such as about 160.0 degrees F. (about seventy-one degrees C.).

When the water heater is supplied power directly, the thermostats provide sole control over the flow of energy to the heating elements to maintain a predetermined temperature in the tank. If the thermostats 34, 36 provide the only control over the flow of energy to the water heater, then the water heater may operate during on-peak energy periods. To provide more control over the operation of the heating elements, the water heater system includes the demand response control panel which is configured to disable or prevent energization of the heating elements in response to the rate or energy usage condition information.

Through an interface of the control panel, a consumer inputs the preferred response to the tiered signal levels from the energy provider and/or the programmed daily off-peak/on-peak demand periods scheduled into the timer. The signal line also delivers this information into the control panel from, for example, utility companies.

The control panel 14 includes a demand response (DR) control 48 which in turn is connected to a transceiver 54, which in turn is connected to a home energy manager 40, which in turn may be connected to a "smart" meter 42. A power connection is provided to the water heater system. The upper and lower heating elements as well as the control panel is provided power from this connection. The control panel serves to interrupt power to the heating elements based on a communication signal to an interfaced port.

The demand response control 48 communicates via a signal line 50 with the home energy manager 40 within a home or directly from an energy provider signal, via a transceiver or hard line connection. The signal line communicates status information such as the response level regarding off-peak and on-peak information from energy generating facilities. The demand response control can be configured to receive and process a signal indicative of a current state of a utility or energy provider. The utility state has an energy cost. The demand response control is configured to override the operating mode of the water heater based on a user selected targeted energy cost. If a current energy cost exceeds the user selected cost, a water heater is operated in an energy saving mode. If current energy cost is less than the user selected cost, the operation control device operates the water heater in a normal operating mode. When the home energy manager (HEM) is configured in the system, the HEM communicates a command signal to the individual appliances, including the water heater according to default or user established parameters, minimizing energy utilization while maintaining functionality.

The home may or may not have the home energy manager. The DR control acts as a radio receiver or has a remote transceiver, which receives a multiple tiered response level signal. A four level response will be used as an example: The signal will be sent as values from 0 to 3: "0" for low or normal operations; "1" for medium, "2" for high, and "3" for critical. In this example, the lower element is disabled when a signal associated with the "on peak" condition is received from the utility. "On peak" may be selectively associated with the medium and high signals for the greatest energy savings, or only the high signal if less interruption in normal operation is desired. As hereinafter described, the user in the illustrative embodiment can select which of these sets of conditions are to trigger an "on peak" response. Both the upper and lower elements are disabled in response to the "critical" signal or condition.

Figure 2:
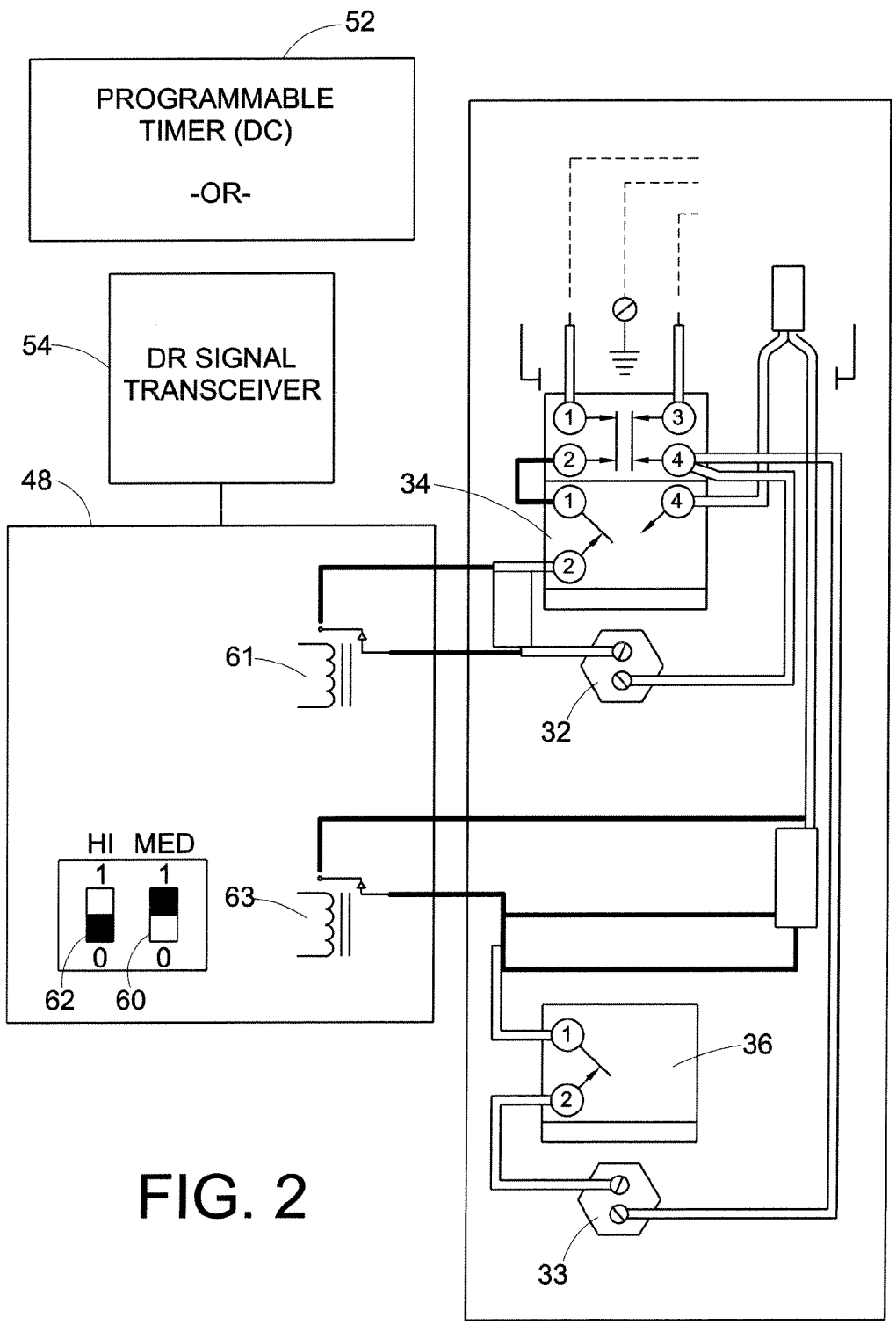
FIG. 2 is a schematic view of a wiring system of the water heater system in accordance with the preferred embodiment of the present disclosure.

Referring now to FIG. 2, the demand response control board 48 is directly connected to the upper heating element 32 and upper thermostat 34 and the lower heating element 33 and lower thermostat 36. The board also communicates with programmable timer 52 or a demand response signal transceiver 54. The control board further has first and second user actuable switches 60 and 61. The state of these switches determine how the system responds to the above described low, medium and high, tiered demand signal from the utility, or more specifically, which signal or combination of signals will be associated with the "on peak" condition. Switch 60 is depressed to the "0" or "off" position if an energy saving response to a medium signal is not desired, and a "1" or "on" position if an energy saving response to a medium signal is desired. Likewise, switch 62 is depressed to the "0" or "off" position when an energy saving response to a high signal is not desired, and the switch is depressed to the "1" or "on" position when an energy saving response to a high signal is desired. By this arrangement the user sets the state of switches 60 and 62 to cause the system to associate an "on peak" condition with both the medium and high signals, or just the high signal. Control board 48 is arranged to operate relay switches 61, 63 in accordance with the state of the switches 60, 62 to enable and disable energization of the upper and lower heating elements, but do not regulate or limit the thermostatic function of the element controls. Rather, the relay switches in the open state simply disable energization of the upper or lower heating elements.

Figure 6:
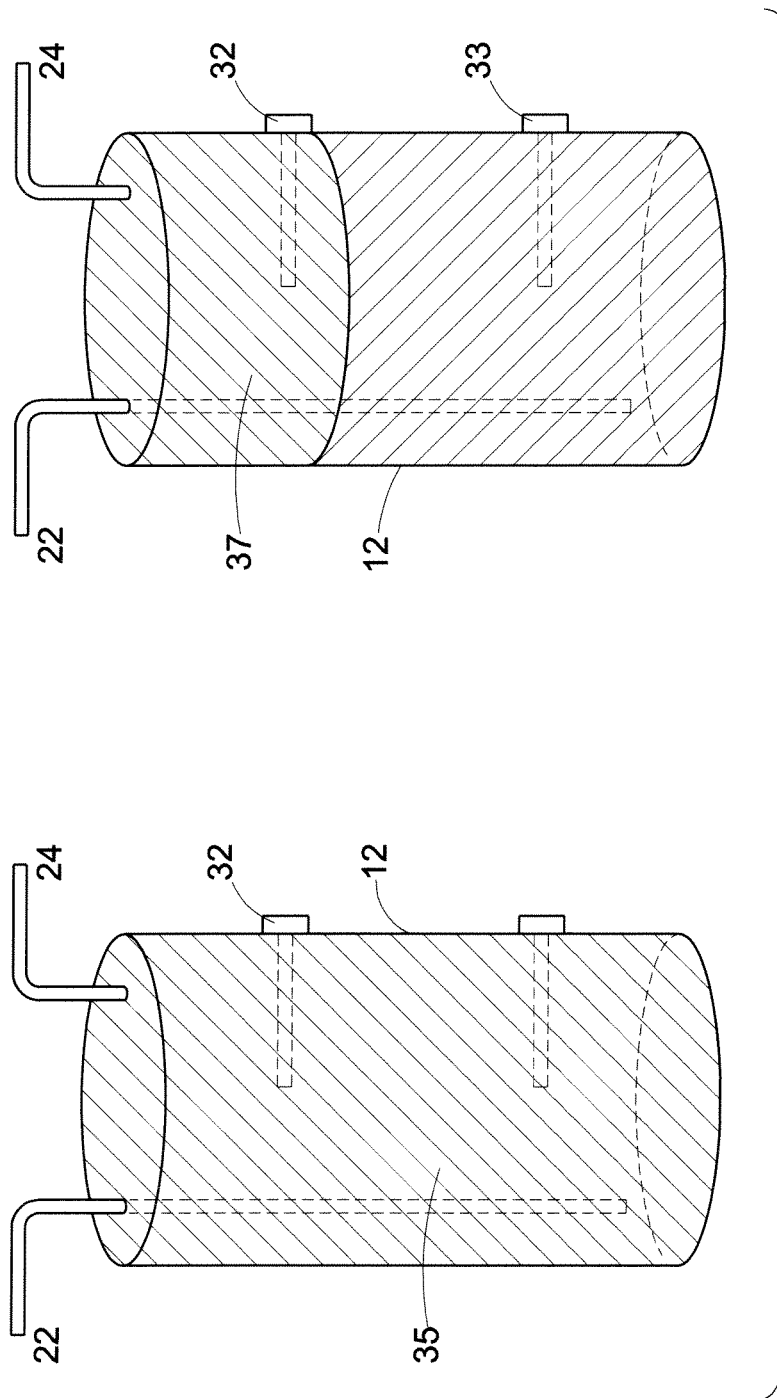
FIG. 6 shows a water heating tank with the entire water volume heated and only the upper volume of water heated.

The operating sequence for the system follows the off peak, on peak energy cost diurnal cycle overlaid on the daily consumer hot water usage profile. The off peak, low energy rate hours are utilized to fully heat the entire volume of the tank. This stored energy is then used to provide a hot water supply over the span of on peak, high energy rate hours. The ability to span the on peak hour duration is dependent on the duration of the on-peak period, the size of the tank and the hot water usage during the period. When an on peak signal is received and based on the selected response condition determined by switches 60, 62, relay switch 63 disables energization of the lower element 33. The upper heating element 32 remains enabled except under a "critical" signal when both elements will be disabled. As hot water is drawn from the upper portion of the tank, cold water enters the bottom of the tank. The density gradient created by the temperature variation of the water creates stratification of the water. FIG. 6 illustrates a schematic of the variable capacity heating volume concept and how the water temperature stratifies in the tank. The left portion of FIG. 6 shows the entire water volume 35 being heated due to both the upper and lower elements 32, 33 being enabled. The right side of FIG. 6 shows only upper portion volume 37 of water being heated by the upper elements 32 being enabled. Ideally the tank is sized to avoid upper element activity; however, if the upper element 32 is used on peak, the heated water will be limited to the upper portion of the tank only.

Sizing of the tank to reduce upper heater activity can be accomplished through increased tank volume and modest set points for both the upper and lower thermostats (120° F.-135° F.). Alternatively, a smaller tank can be used and the lower heating element set point is increased to a maximum (150° F.) and the upper element setting is minimized to 110° F.

Hot water exiting the tank via outlet 24 is replaced by cold water entering the lower portion of the tank via pipe 22. When the tank has been sufficiently depleted of hot water to cause the temperature of the water proximate the upper thermostat 34 to fall, below the set point for the upper thermostat 34, the upper element 32 is activated to heat the water received in the upper portion of the tank. Since lower element 33 is not energized during the on peak period, only the upper element will be used to heat water in the tank during this period. Upon receiving a signal indicating an off peak energy rate, the lower element 33 is enabled, and both the upper and lower elements are energized under the control of their respective thermostats to heat the entire volume of the tank.

Figure 3:
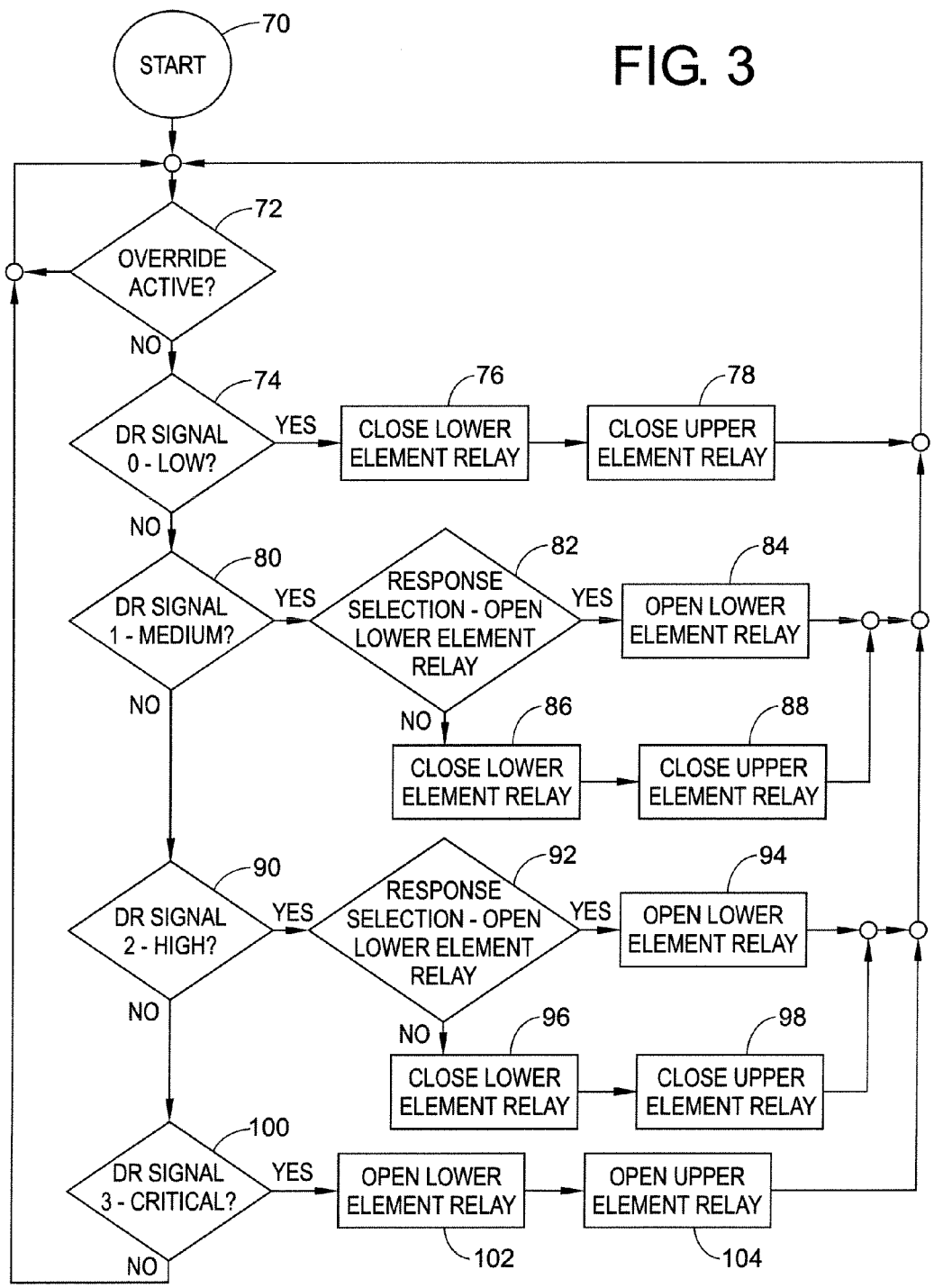
FIG. 3 is a flow diagram of the control logic of the water heater system in accordance with a preferred embodiment of the present disclosure.

Referring now to FIG. 3, a control logic diagram is illustrated. The start position 70 represents receiving a signal from the demand response transceiver 52 for one of the response levels 0, 1, 2, 3. A Yes to "override active?" (position 72) represents that the control panel has been manually overridden or switched off or disengaged by the consumer, allowing the water heater to function under its normal operating controls with no demand response function. The manual override can be a permanent, or timed or a temporary override which resumes operation at the next demand response signal change. A "Yes" at the next position "DR signal 0—low?" (position 74) results in closing relays 61 and 63 positions 76 and 78 respectively enabling energization of the lower element 33. In other words, both the upper element and lower element are enabled for heating the upper and lower regions of the water in the tank respectively.

Referring now to position 80, a "Yes" to the "DR signal equals medium?", signifies receipt of a Medium" signal and a determination is made at position 82 if the state of the switches 60 and 62 call for an energy saving response. A "Yes" corresponds to switch 60 being in the one or on position resulting in the decision to open the lower element relay (position 84) thereby disabling energization of the lower heating element 30. In this case, when the lower element is not enabled, stored energy in the water begins to be depleted. A "No" corresponds to switch 60 being in the zero or off position signifying no energy saving response is desired in response to the medium condition signal and both lower and upper element relays are closed (positions 86 and 88 respectively) thereby enabling energization of both elements under the control of their respective thermostats.

Referring to the DR signal equals high (position 90), the response selection (position 92) determines the state of switches 60 and 62, if zero and one respectively, an energy saving response is desired the answer is "Yes" and the system response is to open the lower element relay (position 94), thereby disabling energization of the lower heating element 30. A "No" answer signifies that an energy saving response is not desired and both the lower and upper element relays are closed (positions 96 and 98) thereby enabling energization of both upper and lower elements under the control of their respective thermostats.

If the DR signal is critical (position 100), then both the lower element relay 63 is opened (position 102), and the upper element relay 61 is opened (position 104) thereby disabling energization of both the upper and lower heating elements.

The disclosure has been described with reference to the preferred embodiments. Obviously, modifications and alterations will occur to others upon reading and understanding the preceding detailed description. It is intended that the invention be construed as including all such modifications and alterations.

What is claimed is:

1. A water heating control and storage system, comprising:
an insulated tank for containing water to be heated;

at least two heating elements including an upper heating element and a lower heating element positioned within said tank; wherein said upper heating element further comprises an upper thermostat and said lower heating element comprises a lower thermostat; and an operation control device configured to (i) operate the system in multiple operating modes comprising a first operating mode where both of said upper heating element and said lower heating element are enabled, a second operating mode where both of said upper heating element and said lower heating element are disabled, and a third operating mode where one of said upper heating element and said lower heating element is enabled and the other of said upper heating element and said lower heating element is disabled to independently heat upper and lower portions of said tank, and (ii) receive and process a demand response signal and in response to said signal selectively operate said system in one of said operating modes or allow said upper thermostat and said lower thermostat to assume control of whether said upper heating element and said lower heating element are respectively enabled or disabled.

2. The water heating control and storage system of claim 1, wherein the water is stored at a temperature in the range of a minimum level or about 90 degrees F. to a maximum level or about 150 degrees F.

3. The water heating control and storage system of claim 1, wherein said upper heating element further comprises an upper thermal limiting device and said lower heating element comprises a lower thermal limiting device.

4. The water heating control and storage system of claim 1, wherein said operating control device is configured to be responsive to demand response signals signifying at least one of the following energy rate conditions: normal or low rate operation, medium rate operation, high rate operation and critical rate operation.

5. The water heating control and storage system of claim 4, wherein said operating control device further comprises a user operable input device and said control device is responsive to said input device to selectively respond to at least one of said medium demand response signal or said high demand response signal or both, by disabling said lower element so that heat is not provided to the lower portion of said tank.

6. The water heating control and storage system of claim 5, wherein when said demand response signal is low, the lower element and upper elements are both enabled to be energized under the control of their respective thermostat.

7. The water heating control and storage system of claim 5, wherein a manual override is provided to override the demand response signal.

8. The water heating control and storage system of claim 4, wherein when said demand response signal is critical, said lower element is shut off and said upper element is shut off so that heat is not provided to the lower portion of said tank and the upper portion of said tank.

9. The water heating control and storage system of claim 5, wherein said user operable input device comprises at least two user operable bi-state switches.

10. The water heating control and storage system of claim 4, wherein said upper heating element and said lower heating element both comprise electrical heating elements.

11. The water heater control and storage system of claim 1, wherein said operating control device comprises a demand response control which is connected to a signal line in communication with a home energy manager device or an energy metering device in communication with an energy provider.

12. The water heater control and storage system of claim 1, wherein said upper element is set to a minimum level, and said lower element is set to a maximum level.

13. The water heater control and storage system of claim 12 wherein said upper minimum level is approximately 110 degrees F. and the maximum level is approximately 150 degrees F.

14. The water heating control and storage system of claim 1, wherein said operation control device is configured to receive and process a signal indicative of a current state of an associated utility.

15. The water heating control and storage system of claim 14, wherein the utility state has an associated energy cost and wherein the operation control device is configured to override the operating mode of the water heater based on a user selected targeted energy cost, wherein if current energy cost exceeds the user selected cost, the operation control device operates the water heater in an energy savings mode, and wherein if the current energy cost is less than the user selected cost, the operation control device operates the water heater in a normal operating mode.

16. A method for controlling a water heating storage system, comprising the following steps:

providing an insulated tank for containing water to be heated;

providing an upper heating element with an upper thermostat and a lower heating element with a lower thermostat to heat upper and lower portions of water inside said tank;

providing a controller configured to (i) operate the system in multiple operating modes comprising a first operating mode where both of said upper heating element and said lower heating element are enabled, a second operating mode where both of said upper heating element and said lower heating element are disabled, and a third operating mode where one of said upper heating element and said lower heating element is enabled and the other of said upper heating element and said lower heating element is disabled to independently heat the upper and lower portions of said tank, and (ii) receive and process a demand response signal and in response to said signal selectively operate said system in one of said operating modes or allow said upper thermostat and said lower thermostat to assume control of whether said upper heating element and said lower heating element are respectively enabled or disabled;

receiving and processing a demand response signal via the controller; and based on a state of the response signal, selectively operating the system in one of the three operating modes or allowing the upper thermostat and the lower thermostat to assume control of whether the upper heating element and the lower heating element are respectively enabled or disabled.

17. The method of claim 16, wherein the water is stored at a temperature in the range of a minimum level or about 90 degrees F. to a maximum level or about 150 degrees F.

18. The method of claim 16, wherein the demand response signal comprises distinct signal levels, each level corresponding to one of the following parameters:

normal or low rate operation, medium rate operation, high rate operation, and critical rate operation.

19. The method of claim 18, wherein a manual override is provided to override the demand response signal.

20. The method of claim 18, wherein when said demand response signal is low, the lower heating element and upper heating element are both enabled to be energized under the control of their respective thermostats.

21. The method of claim 18, wherein when said demand response signal is medium, said lower heating element is shut off so that heat is not provided to the lower portion of said tank or both said upper element and said lower element are powered so that heat is provided to the upper and lower portions of said tank.

22. The method of claim 18, wherein when said demand response signal is high, said lower heating element is shut off so that heat is not provide to the lower portion of said tank or both said upper element and said lower element are powered so that heat is provided to the upper and lower portions of said tank.

23. The method of claim 18, wherein when said demand response signal is critical, said lower heating element is shut off and said upper heating element is shut off so that heat is not provided to the lower portion of said tank and the upper portion of said tank.

* * * * *

UNITED STATES PATENT AND TRADEMARK OFFICE
CERTIFICATE OF CORRECTION

| | | |
|---|---|---|
| PATENT NO. | : 8,498,527 B2 | Page 1 of 1 |
| APPLICATION NO. | : 12/623753 | |
| DATED | : July 30, 2013 | |
| INVENTOR(S) | : Roetker et al. | |

It is certified that error appears in the above-identified patent and that said Letters Patent is hereby corrected as shown below:

In the Specification

In Column 2, Line 12, delete "miming out" and insert -- running out --, therefor.

In the Claims

In Column 9, Line 63, in Claim 11, delete "water heater" and insert -- water heating --, therefor.

In Column 10, Line 1, in Claim 12, delete "water heater" and insert -- water heating --, therefor.

In Column 10, Line 4, in Claim 13, delete "water heater" and insert -- water heating --, therefor.

In Column 10, Line 4, in Claim 13, delete "claim 12" and insert -- claim 12, --, therefor.

Signed and Sealed this
Twenty-ninth Day of October, 2013

Teresa Stanek Rea
*Deputy Director of the United States Patent and Trademark Office*